(12) United States Patent
Kawashima (10) Patent No.: US 10,359,046 B2
(45) Date of Patent: Jul. 23, 2019

(54) MAGNETIC BEARING DEVICE AND VACUUM PUMP

(71) Applicant: Edwards Japan Limited, Yachiyo-shi, Chiba (JP)

(72) Inventor: Toshiaki Kawashima, Yachiyo (JP)

(73) Assignee: Edwards Japan Limited, Yachiyo-shi (JP)

( * ) Notice: Subject to any disclaimer, the term of this patent is extended or adjusted under 35 U.S.C. 154(b) by 369 days.

(21) Appl. No.: 15/037,071

(22) PCT Filed: Oct. 3, 2014

(86) PCT No.: PCT/JP2014/076500
§ 371 (c)(1),
(2) Date: May 17, 2016

(87) PCT Pub. No.: WO2015/079802
PCT Pub. Date: Jun. 4, 2015

(65) Prior Publication Data
US 2016/0290351 A1    Oct. 6, 2016

(30) Foreign Application Priority Data

Nov. 29, 2013  (JP) ................................. 2013-246961

(51) Int. Cl.
*H02K 7/09*     (2006.01)
*F04D 19/04*    (2006.01)
(Continued)

(52) U.S. Cl.
CPC ......... *F04D 29/058* (2013.01); *F04D 19/042* (2013.01); *F04D 27/00* (2013.01);
(Continued)

(58) Field of Classification Search
CPC .... F04D 29/058; F04D 29/053; F04D 19/042; F04D 27/00; F16C 32/0451;
(Continued)

(56) References Cited

U.S. PATENT DOCUMENTS

| | | | |
|---|---|---|---|
| 5,256,637 A * | 10/1993 | Rao | F16C 32/0463 310/90.5 |
| 6,700,258 B2 * | 3/2004 | McMullen | F16C 32/0465 310/90.5 |

(Continued)

FOREIGN PATENT DOCUMENTS

| | | |
|---|---|---|
| CN | 1719716 A | 11/2006 |
| EP | 1318310 | 6/2003 |

(Continued)

OTHER PUBLICATIONS

Extended Search Report from counterpart European Application No. 14865812.3, dated Jun. 13, 2017, 7 pp.

(Continued)

*Primary Examiner* — Forrest M Phillips
(74) *Attorney, Agent, or Firm* — Shumaker & Sieffert, P.A.

(57) ABSTRACT

Provided is a magnetic bearing device which allows easy initial adjustment and allows optimal bearing control to be performed by a simple algorithm without increasing a memory capacity of a controller. A pair of square multipliers and an adder acquire respective steady-state current values of a pair of electromagnets which attract a rotor shaft of a magnetic bearing not shown in opposite radial directions, square the respective steady-state current values, and add up the respective squared steady-state current values. Then, to optimally change respective currents in the electromagnets in accordance with a mounting posture of the magnetic bearing, a correction coefficient arithmetic operator calculates a correction gain instruction value acting on the elec- (Continued)

tromagnets from the steady-state current values squared/added up. Then, a gain instruction value obtained by adding the correction gain instruction value to a fundamental gain of a control circuit for the electromagnets is input to a gain amplifier. The gain amplifier generates a corrected current instruction value on the basis of the gain instruction value and optimally controls the magnetic bearing.

18 Claims, 5 Drawing Sheets

(51) Int. Cl.
*F04D 27/00* (2006.01)
*F16C 32/04* (2006.01)
*F04D 29/053* (2006.01)
*F04D 29/058* (2006.01)

(52) U.S. Cl.
CPC ........ *F04D 29/053* (2013.01); *F16C 32/0451* (2013.01); *F16C 32/0489* (2013.01); *H02K 7/09* (2013.01); *F16C 2231/00* (2013.01); *F16C 2233/00* (2013.01); *F16C 2300/30* (2013.01); *F16C 2360/00* (2013.01); *F16C 2360/45* (2013.01)

(58) Field of Classification Search
CPC ............. F16C 32/0489; F16C 2231/00; F16C 2233/00; F16C 2300/30; F16C 2360/00; F16C 2360/045; H02K 7/09
USPC ....................................................... 310/90.5
See application file for complete search history.

(56) References Cited

U.S. PATENT DOCUMENTS

| | | | | |
|---|---|---|---|---|
| 7,057,319 | B2 * | 6/2006 | Yamada | .................. F16F 15/18 310/90.5 |
| 7,830,056 | B2 * | 11/2010 | Barada | ................ F16C 32/0448 310/90.5 |

FOREIGN PATENT DOCUMENTS

| | | | | |
|---|---|---|---|---|
| EP | 1318310 | A1 * | 6/2003 | ........... F04D 19/048 |
| JP | 6483916 | A | 3/1989 | |
| JP | 02134410 | A | 5/1990 | |
| JP | 0484915 | U | 7/1992 | |
| JP | H05141423 | A | 6/1993 | |
| JP | 0942290 | A | 2/1997 | |
| JP | H09126237 | A | 5/1997 | |
| JP | 2006083924 | A | 3/2006 | |
| WO | 2006030824 | A1 | 3/2006 | |
| WO | 2013100104 | A1 | 7/2013 | |

OTHER PUBLICATIONS

Translation and original International Search Report received in International Application No. PCT/JP2014/076500 dated Dec. 22, 2014, 5 pgs.

Examination Report from counterpart European Application No. 14865812.3, dated Jul. 23, 2018, 5 pp.

* cited by examiner

MAGNETIC BEARING DEVICE AND VACUUM PUMP

This application is a national stage entry under 35 U.S.C. § 371 of International Application No. PCT/JP2014/076500, filed Oct. 3, 2014, which claims the benefit of JP Application 2013-246961, filed Nov. 29, 2013. The entire contents of International Application No. PCT/JP2014/076500 and JP Application 2013-246961.

TECHNICAL FIELD

The present disclosure relates to a magnetic bearing device including a magnetic bearing that supports a rotor in a state of non-contact using an electromagnetic force of an electromagnet, and a controller that controls the magnetic bearing and to a vacuum pump using the magnetic bearing device.

BACKGROUND

Conventionally, a magnetic bearing (five-axis-control magnetic bearing) which supports, of 6 degrees of freedom of a rotor (rigid body), 5 degrees of freedom using an electromagnetic force (suction force) of an electromagnet has been widely known. Such a magnetic bearing has excellent performance including a long lifetime due to a non-contact bearing portion free from abrasion, applicability to an ultra-high-speed rotary device due to an extremely small bearing loss, capability of low-vibration/low-noise rotation due to arbitrarily adjustable rigidity/attenuation properties of the bearing, and the like. Accordingly, such a magnetic bearing is used in, e.g., a vacuum pump used for a semiconductor manufacturing device or the like, a turbo molecular pump, a turbine generator, a machine tool, or the like.

However, in such a magnetic bearing, when a rotor shaft is rotated, due to a magnetic flux of electromagnets included in the magnetic bearing, an eddy current causes an iron loss in the rotor shaft, which may increase a temperature of the rotor shaft. This causes a problem such as a reduction in a tolerable flow rate of a vacuum pump including the magnetic bearing. At this time, when the vacuum pump is disposed perpendicular, by reducing currents (excitation currents) in the electromagnets included in the magnetic bearing, a rise in the temperature of the rotor shaft can be suppressed. However, in the case where the currents in the electromagnets are reduced, even though the vacuum pump is disposed perpendicular and stably rotated, when the vacuum pump is disposed horizontal again, a weight of the rotor shaft is applied in a radial direction to the electromagnets. Consequently, the rigidity (floating repulsive force) of the magnetic bearing decreases and the rotor shaft may not stably rotate any longer. Conversely, in the case where the vacuum pump is disposed horizontal and the rotor shaft is stably rotated, when the vacuum pump is disposed perpendicular again, the rigidity of the magnetic bearing (repulsive force toward a shaft center) excessively increases so that oscillation or vibration due to a shaft center shift or the like is more likely to occur.

That is, in accordance with the state of installment of a semiconductor manufacturing device or the like, a vacuum pump can freely be mounted in any mounting posture such as in a vertical direction, an inclined direction, a horizontal direction, or an inverted direction. At this time, to allow optimal currents to flow to the electromagnets of the magnetic bearing in accordance with a mounting posture of the vacuum pump, the currents flowing from the controller to the electromagnets should optimally be controlled. Accordingly, a technique for a magnetic bearing device is disclosed which selectively switches between control constants for a current compensation circuit so as to allow constantly optimal currents to flow in accordance with a direction in which the vacuum pump (i.e., rotor shaft of the magnetic bearing) is disposed. At this time, as the control constants to be selectively switched, constants determined in advance by experiment or the like in accordance with the direction in which the vacuum pump is disposed are used (see, e.g., Japanese Patent Application Publication No. H9-42290).

SUMMARY

However, since the technique disclosed in Japanese Patent Application Publication No. H9-42290 mentioned above switches between the plurality of control constants determined in advance in accordance with the direction in which the vacuum pump (rotation shaft of the magnetic bearing) is disposed, the large number of control constants need to be stored in a control circuit. This may undesirably increase a memory capacity of the controller. Also, a large amount of time may be required for initial adjustment of a relationship between the direction in which the vacuum pump is disposed and the control constant for the currents. In addition, in a use application in which the direction in which the vacuum pump is disposed dynamically changes, the currents transiently fluctuate at the moment of switching between the control constants to possibly cause vibration in the magnetic bearing.

This results in the occurrence of a technical problem to be solved to allow easy initial adjustment and allow optimal bearing control to be performed by a simple algorithm without increasing the memory capacity of the controller. An object of the present disclosure is to solve the problem.

The present disclosure has been proposed to attain the foregoing object. The disclosure in a first aspect provides a magnetic bearing device, including: a magnetic bearing that supports a rotor shaft in a state of non-contact, using an electromagnetic force of an electromagnet; and a controller that controls the magnetic bearing, wherein the controller includes: a current acquisition means for acquiring steady-state current values of respective currents flowing in a pair of the electromagnets that attract the rotor shaft of the magnetic bearing in opposite directions; a correction coefficient arithmetic means for determining, from the steady-state current values, a correction gain instruction value for compensating for an unstable spring constant due to an attracting force of a pair of the electromagnets, which results from a mounting posture of the magnetic bearing; a first addition means for adding up the correction gain instruction value and a fundamental gain, which is uniquely determined irrespective of the mounting posture of the magnetic bearing, to obtain a gain instruction value; and a current control means for controlling respective currents flowing in a pair of the electromagnets in accordance with a current instruction value generated on the basis of the gain instruction value.

In the configuration, the current acquisition unit acquires the respective steady-state current values of a pair of the electromagnets that attract the rotor shaft of the magnetic bearing in the opposite radial directions. Accordingly, the correction coefficient arithmetic unit calculates, from the respective steady-state current values, the correction gain instruction value for compensating for the unstable spring constant due to the attracting force of a pair of the electromagnets which results from the mounting posture of the magnetic bearing. Then, the first addition unit adds up the correction gain instruction value and the fundamental gain which is uniquely determined irrespective of the mounting posture of the magnetic bearing to obtain the gain instruction value. This allows the current control unit to generate the current instruction value on the basis of the gain instruction value and control the respective currents flowing in the pair of electromagnets on the basis of the current instruction value. As a result, even when the mounting posture of the magnetic bearing changes, the magnetic bearing can be controlled in a constantly optimal state.

The disclosure in a second aspect provides the magnetic bearing device having the configuration of the magnetic bearing device in the first aspect, wherein the current acquisition unit acquires the steady-state current values on the basis of current detection values of respective currents flowing in a pair of the electromagnets or on the basis of the current instruction value.

In the configuration, the current acquisition unit may acquire the steady-state current values from the current detection values of the respective currents flowing in a pair of the electromagnets or from the current instruction value generated by the current control unit. In the former case, the correction gain instruction value is generated by acquiring the current detection values resulting from feedback control. However, in the latter case, the correction gain instruction value is generated by acquiring the current instruction value prior to the feedback control. Accordingly, in the latter case, control responsiveness is higher.

The disclosure in a third aspect provides the magnetic bearing device having the configuration of the magnetic bearing device in the first or second aspect, wherein the current control unit controls a force instruction middle signal having position information of the rotor shaft in accordance with the gain instruction value, and adds up the force instruction middle signal, which is controlled in accordance with the gain instruction value, and a bias current setting value to generate the current instruction value.

In the configuration, the current control unit adds up the force instruction middle signal having the position information of the rotor shaft and the bias current setting value to generate the current instruction value. As a result, proper bearing control can be performed on a decentered state of the rotor shaft.

The disclosure in a fourth aspect provides the magnetic bearing device having the configuration of the magnetic bearing device in any one of the first to third aspects, wherein the current instruction value cancels out the unstable spring constant for a pair of the electromagnets and exerts only a force which returns the rotor shaft to a center of the magnetic bearing.

In the configuration, by adding up the correction gain instruction value and the fundamental gain, a state is achieved in which a moment-later total attracting force of a pair of the facing electromagnets is a sum of a present-time total attracting force of a pair of the electromagnets and only a spring force which returns the rotor shaft to the center of the magnetic bearing, while the attracting force due to the unstable spring constant of the magnet bearing is cancelled out. That is, a pair of the facing electromagnets exert only the force which returns the rotor shaft to the center of the magnetic bearing.

The disclosure in a fifth aspect provides the magnetic bearing device having the configuration of the magnetic bearing device in any one of the first to fourth aspects, wherein the current acquisition unit includes a pair of squaring units that individually square the steady-state current values of the respective currents flowing in a pair of the electromagnets, and a second addition unit that adds up the steady-state current values individually squared by a pair of the squaring units.

In the configuration, in the current acquisition unit, a pair of the squaring units individually square the steady-state current values acquired from the individual electromagnets and the second addition unit adds up the two squared steady-state current values and inputs the result of the addition to the correction coefficient arithmetic unit. This allows the correction coefficient arithmetic unit to determine a higher-accuracy correction gain instruction value.

The disclosure in a sixth aspect provides the magnetic bearing device having the configuration of the magnetic bearing device in the fifth aspect and further including a low pass filter that performs an averaging process on the steady-state current values squared/added up by a pair of the squaring units and the second addition unit and transmits a value resulting from the averaging process to the correction constant arithmetic unit.

In the configuration, the current acquisition unit (a pair of the squaring units and the second addition unit) causes the steady-state current values squared/added up to pass through the low-pass filter and then transmits the resulting value to the correction coefficient arithmetic unit. As a result, it is possible to remove noise and ripple each resulting from a rotation frequency of the magnetic bearing. This allows the correction coefficient arithmetic unit to implement the correction gain instruction value including neither noise nor ripple.

The disclosure in a seventh aspect provides the magnetic bearing device having the configuration of the magnetic bearing device in the sixth aspect, wherein the low-pass filter has a resonance frequency of about 1 Hz.

In the configuration, the resonance frequency of the low pass filter has been set to about 1 Hz. This causes no reduction in the control responsiveness of the magnetic bearing.

The disclosure in an eighth aspect provides the magnetic bearing device having the configuration of the magnetic bearing device in any one of the third to seventh aspects and further including a linearization unit that linearizes in accordance with the bias current setting value, a non-linear characteristic showing a relationship between the current instruction value generated by the current control unit and the attracting force of the electromagnets.

In the configuration, the attracting force of the electromagnets is proportional to a square of each of the currents. Accordingly, a force-current characteristic has non-linearity and, unless appropriate measures are taken, the current control by the current control unit tends to be unstable. To prevent this, the force-current characteristic is linearized in accordance with the bias current setting value to thus stabilize the current control.

The disclosure in a ninth aspect provides the magnetic bearing device having the configuration of the magnetic bearing device in the eighth aspect, wherein the linearization unit functions only when no current is flowing in each of a pair of the electromagnets.

In the configuration, the linearization unit linearizes the force-current characteristic in accordance with the bias current setting value. Accordingly, when a current is flowing in each of a pair of the electromagnets, it is necessary to halt the function of the linearization unit.

Note that the controller is applicable to the control of a one-axis-control magnetic bearing device or a three-axis-control magnetic bearing device, but is also applicable to a five-axis-control magnetic bearing device which supports, of 6 degrees of freedom of the rotor shaft, 5 degrees of freedom of the rotor shaft by the attracting force of the electromagnets.

When the controller is applied to, e.g., the five-axis-control magnetic bearing device, it is possible to control the magnetic bearing used in a vacuum pump, a turbo molecular pump, a water turbine generator, a precision machine tool, or the like with high accuracy.

The disclosure in a tenth aspect provides a vacuum pump including the magnetic bearing device in any one of the first to ninth aspects.

According to the present disclosure, even when a direction in which the magnetic bearing is disposed is changed in a state where the currents in the electromagnets included in the magnetic bearing are set low, the controller controls the magnetic bearing in accordance with the current instruction value generated on the basis of the gain instruction value obtained by adding up the fundamental gain and an instability compensation gain (compensation gain instruction value). As a result, even when the direction in which the magnetic bearing is disposed changes, the rigidity of the magnetic bearing does not change. This can suppress vibration of the magnetic bearing resulting from a change in the direction in which the magnetic bearing is disposed. In addition, since the function of the controller can be implemented by a relatively simple algorithm, a memory capacity of the controller can be reduced and initial adjustment of the currents corresponding to a mounting posture in which the vacuum pump is disposed can easily be performed. Moreover, even in a use application in which the direction in which the magnetic bearing is disposed dynamically changes, the control gain of the magnetic bearing continuously changes to be able to suppress vibration of the magnetic bearing.

DETAILED DESCRIPTION

To attain the object of allowing easy initial adjustment and allowing optimal bearing control to be performed by a simple algorithm without increasing a memory capacity of a controller, the present disclosure provides a magnetic bearing device including a magnetic bearing that supports a rotor shaft in a state of non-contact using an electromagnetic force of an electromagnet and a controller that controls the magnetic bearing. The controller includes a current acquisition unit that acquires steady-state current values of respective currents flowing in a pair of the electromagnets that attract the rotor shaft of the magnetic bearing in opposite directions, a correction coefficient arithmetic unit that determines, from the steady-state current values, a correction gain instruction value for compensating for an unstable spring constant due to an attracting force of a pair of the electromagnets which results from a mounting posture of the magnetic bearing, a first addition unit that adds up the correction gain instruction value and a fundamental gain which is uniquely determined irrespective of the mounting posture of the magnetic bearing to obtain a gain instruction value, and a current control unit that controls the current flowing in each of a pair of the electromagnets in accordance with a current instruction value generated on the basis of the gain instruction value.

That is, the magnetic bearing device according to an embodiment of the present disclosure acquires respective steady-state current values (Ip, Im) of a pair of the electromagnets which attract the rotor shaft of the magnetic bearing in opposite radial directions. Then, to optimally change each of the currents in accordance with a mounting posture of the magnetic bearing, the magnetic bearing device calculates an instability compensation gain (correction gain instruction value) Kcomp which acts on the electromagnets from the acquired steady-state current values (Ip, Im). Then, the magnetic bearing device adds the correction gain instruction value Kcomp to a fundamental gain Kctrl of a control circuit of the electromagnets to generate the gain instruction value. Then, the magnetic bearing device controls the magnetic bearing in accordance with a current instruction value corrected using the gain instruction value. This allows the magnetic bearing to be controlled in a constantly optimal state even when the mounting posture of the magnetic bearing changes.

Figure 1:
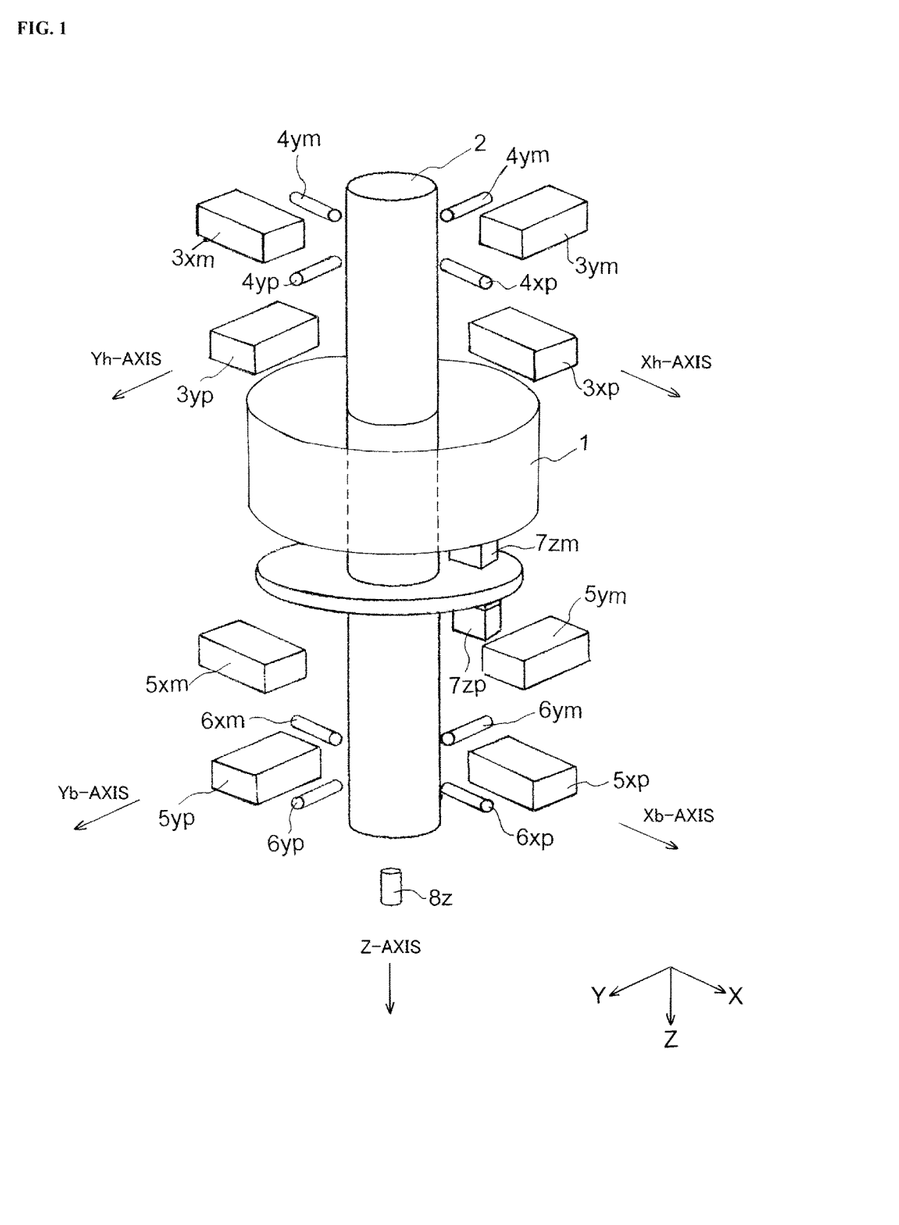
FIG. 1 is a schematic configuration diagram of a five-axis-control magnetic bearing applied to an embodiment of the present disclosure.

Referring to FIGS. 1 through 5, a detailed description will be given of a preferred embodiment of the magnetic bearing device according to the present disclosure. FIG. 1 is a schematic configuration diagram of a five-axis-control magnetic bearing applied to the embodiment of the present disclosure. The five-axis-control magnetic bearing shows a configuration in which control electromagnets and a displacement sensor are arranged along each of four radial axes and control electromagnets and a displacement sensor are disposed along one axial axis. That is, the five-axis-control magnetic bearing is configured so as to positively control movement in five degrees of freedom (including the three degrees of freedom for translational movement of a center of gravity and the two degrees of freedom for rotary movement around the center of gravity) other than the degree of freedom around a rotary shaft.

In the five-axis-control magnetic bearing, four radial electromagnets $3xp$, $3xm$, $3yp$, and $3ym$ are arranged in respective pairs for an X-axis and a Y-axis in radial direction around a rotor shaft (rotary shaft) 2 above a DC motor 1 which is rotatably driven by the DC motor 1. In correspondence to the respective positions of the radial electromagnets $3xp$, $3xm$, $3yp$, and $3ym$, radial sensors $4xp$, $4xm$, $4yp$, and $4ym$ are arranged. Likewise, four radial electromagnets $5xp$, $5xm$, $5yp$, and $5ym$ are arranged in respective pairs for the X-axis and the Y-axis in the radial direction around the rotor shaft (rotary shaft) 2 below the DC motor 1. In correspondence to the respective positions of the radial electromagnets $5xp$, $5xm$, $5yp$, and $5ym$, radial sensors $6xp$, $6xm$, $6yp$, and $6ym$ are arranged. The eight radial electromagnets $3xp$, $3xm$, $3yp$, $3ym$, $5xp$, $5xm$, $5yp$, and $5ym$ are included in a radial magnetic bearing.

In addition, in an axial direction of the rotor shaft 2, two axial electromagnets $7zm$ and $7zp$ are arranged in a vertical pair to be included in an axial magnetic bearing. Note that, at a lower end portion of the rotor shaft 2, an axial sensor 8z is disposed.

Those of the radial electromagnets 3xp, 3xm, 3yp, 3ym, 5xp, 5xm, 5yp, and 5ym which are arranged along the X-axis direction and those of the radial sensors 4xp, 4xm, 4yp, 4ym, 6xp, 6xm, 6yp, and 6ym which arranged along the X-axis are respectively paired up. On the other hand, those of the radial electromagnets 3xp, 3xm, 3yp, 3ym, 5xp, 5xm, 5yp, and 5ym which are arranged along the Y-axis direction and those of the radial sensors 4xp, 4xm, 4yp, 4ym, 6xp, 6xm, 6yp, and 6ym which are arranged along the Y-axis are respectively paired up. Each of the resulting pairs independently forms a feedback control system which controls currents (excitation currents) to adjust the attracting force of each pair of the radial electromagnets. As a result, the rotor shaft 2 is rotatably driven by the DC motor 1, while being controlled to have a rotation axis thereof at a center position. Note that the axial electromagnets 7zm and 7zp and the axial sensor 8z also form a feedback control system. The following is a detailed description of the X-axis, Y-axis, and Z-axis directions described above. In FIG. 1, the X-axis closer to an upper part of the bearing serves as an Xh-axis and the Y-axis closer to the upper part of the bearing serves as an Yh-axis, while the X-axis closer to a lower part of the bearing serves as an Xb-axis and the Y-axis closer to the lower part of the bearing serves as an Yb-axis. On the other hand, the axial direction of the rotor shaft 2 serves as a Z-axis.

Figure 2:
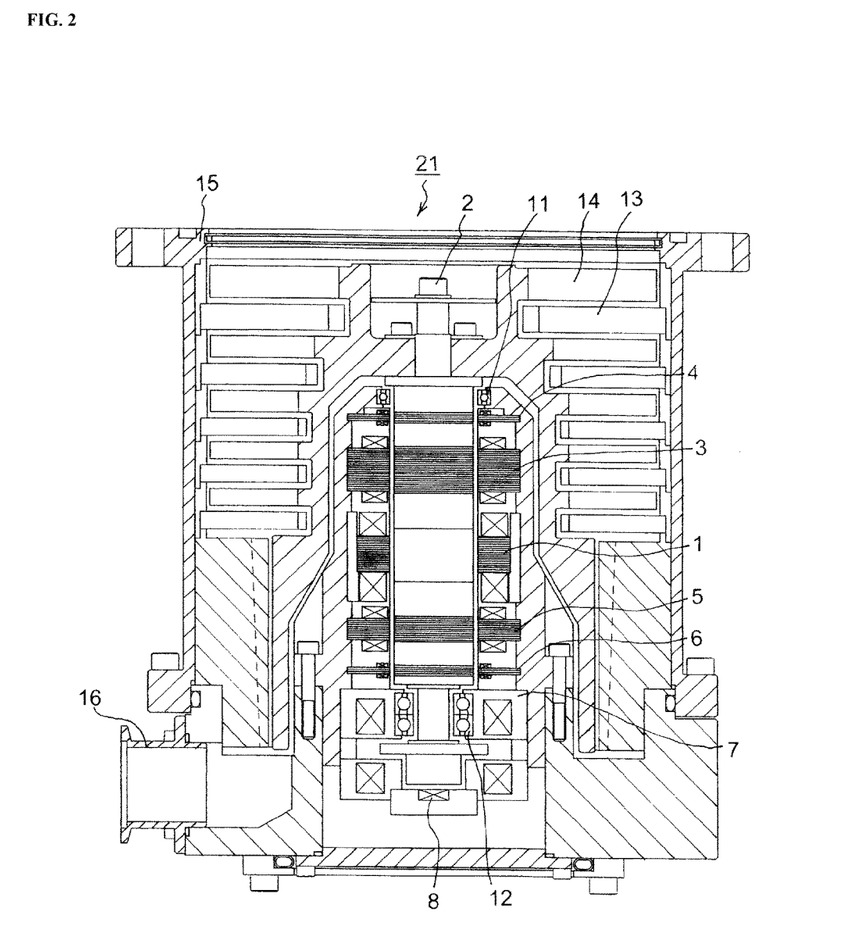
FIG. 2 is a cross-sectional view showing a configuration of a vacuum pump including the magnetic bearing applied to the embodiment of the present disclosure.

FIG. 2 is a cross-sectional view showing a configuration of a vacuum pump including the magnetic bearing applied to the embodiment of the present disclosure. The vacuum pump forms a turbo molecular pump including composite vanes. As shown in FIG. 2, in the middle portion of the vacuum pump 21, the rotor shaft 2 is rotatably disposed. To the middle portion of the rotor shaft 2, the DC motor 1 for rotatably driving the rotor shaft 2 is attached. In the radial direction of the rotor shaft 2 located above the DC motor 1, a radial electromagnet 3 is disposed and composed as one of magnetic bearing for the rotor shaft 2. Note that, in the vicinity of the radial electromagnet 3, a radial sensor 4 for detecting a displacement of the rotor shaft 2 is disposed.

On the other hand, in the radial direction of the rotor shaft 2 located below the DC motor 1, a radial electromagnet 5 is disposed and composed as the other magnetic bearing for the rotor shaft 2. Note that, in the vicinity of the radial electromagnet 5, a radial sensor 6 for detecting a displacement of the rotor shaft 2 is disposed.

In addition, in the vicinity of the lower end portion of the rotor shaft 2, an axial electromagnet 7 is disposed in the axial direction to form the magnetic bearing in the axial direction for the rotor shaft 2. At the lower end portion of the rotor shaft 2, an axial sensor 8 for detecting a displacement of the rotor shaft 2 in the axial direction is disposed. Note that, at the upper and lower end portions of the rotor shaft 2, protective dry bearings 11 and 12 are respectively disposed to suppress an abnormal displacement of the rotor shaft 2 due to oscillation of the radial magnetic bearings 4 and 5 or the like.

In a stationary part of the vacuum pump 21, a stator vane 13 is disposed and a rotor vane 14 is rotatably disposed to face the stator vane 13. Due to such a configuration, when the rotor shaft 2 is rotatably driven by the DC motor 1 to rotate, the rotor vane 14 rotates relative to the stator vane 13 so that air from a vessel not shown is sucked in from an inlet port flange 15 and exhausted to the outside from an outlet port flange 16. Since the vacuum pump 21 rotates at a high rotation speed of, e.g., 800 Hz (1.25 msec/one revolution), it is possible to maintain an extremely high vacuum state in an intended vessel.

Figure 3:
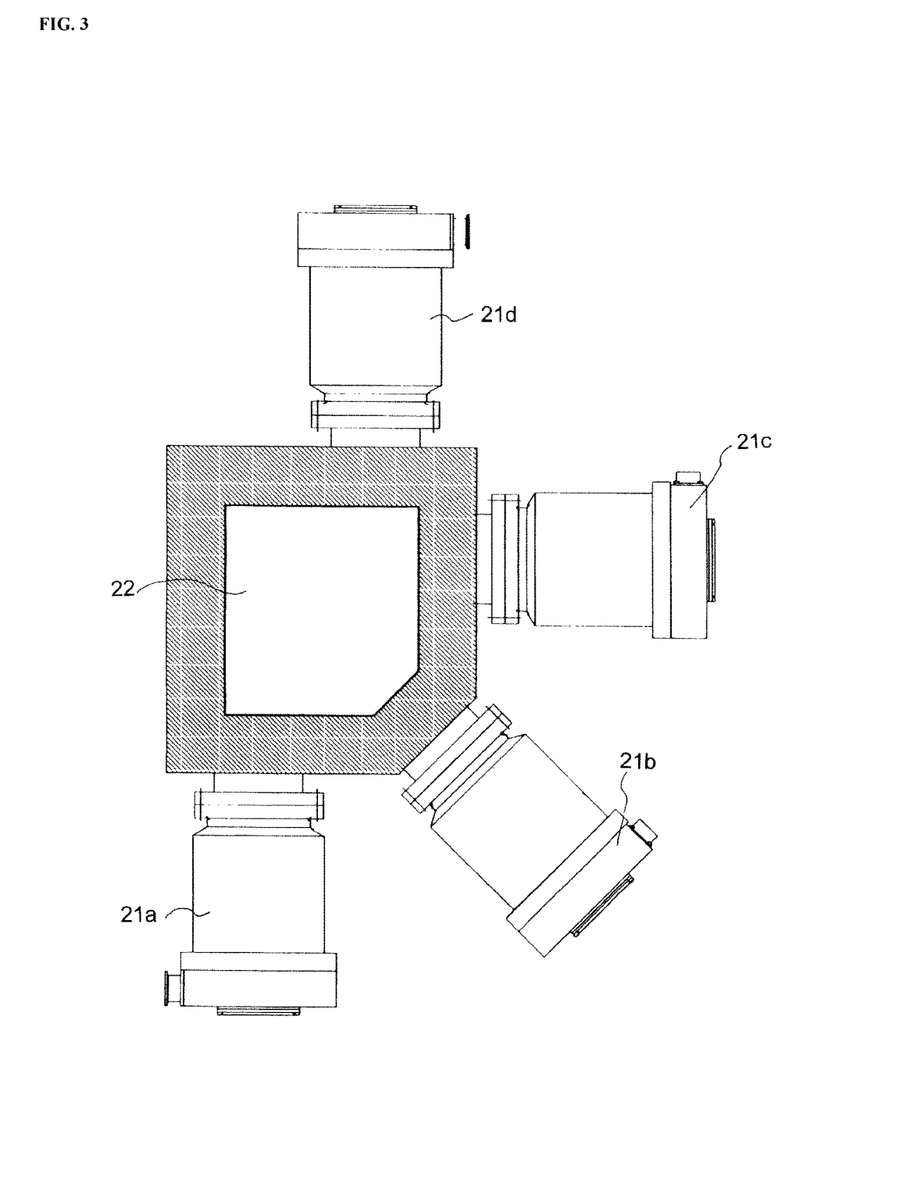
FIG. 3 is a conceptual view showing a mounting posture of the vacuum pump applied to the embodiment of the present disclosure when the vacuum pump is mounted on a semiconductor manufacturing device.

FIG. 3 is a conceptual view showing a mounting posture of the vacuum pump applied to the embodiment of the present disclosure when the vacuum pump is mounted on a semiconductor manufacturing device. As shown in FIG. 3, the vacuum pump 21 is mounted in an optimal posture onto a semiconductor manufacturing device 22. For example, when it is assumed that a downward direction in the drawing is a direction of gravity, the vacuum pump 21 can be mounted in a vertical direction as a vacuum pump 21a, mounted in an inclined direction as a vacuum pump 21b, mounted in a horizontal direction as a vacuum pump 21c, or mounted in an up-side down direction as a vacuum pump 21d.

As shown in FIG. 3, when the vacuum pump 21a is mounted as the vacuum pump 21 in the direction vertical to the semiconductor manufacturing device 22, a weight of the rotor shaft of the magnetic bearing is not at all applied to the electromagnets in the radial direction. However, when the vacuum pump 21c is mounted as the vacuum pump 21 in the direction horizontal to the semiconductor manufacturing device 22, the total weight of the rotor shaft of the magnetic bearing is applied to the electromagnets in the radial direction. That is, since the vacuum pump 21 can be mounted in various mounting postures on the semiconductor manufacturing device 22, to or from the electromagnetic force of the magnetic bearing configured in the vacuum pump 21, the weight of the rotor shaft is variably added (or subtracted) due to a vector direction of gravity. Accordingly, to stably maintain the rigidity of the magnetic bearing irrespective of the mounting posture of the vacuum pump 21, it is necessary to properly control the currents in the magnetic bearings by a relatively simple algorithm. To satisfy the necessity, the embodiment of the present disclosure extracts a force of an unstable spring constant (unstable factor) of each of the electromagnets which varies depending on the mounting posture of the magnetic bearing and uses the unstable factor as an instability compensation gain. Then, the embodiment adds the instability compensation gain to a fundamental gain which is uniquely determined irrespective of the mounting posture of the magnetic bearing to generate a gain instruction value. The embodiment further generates a current instruction value which is optimal for each of the mounting postures on the basis of the gain instruction value and properly controls a pair of the electromagnets in accordance with the generated current instruction value. The following will describe the foregoing process in detail.

Figure 4:
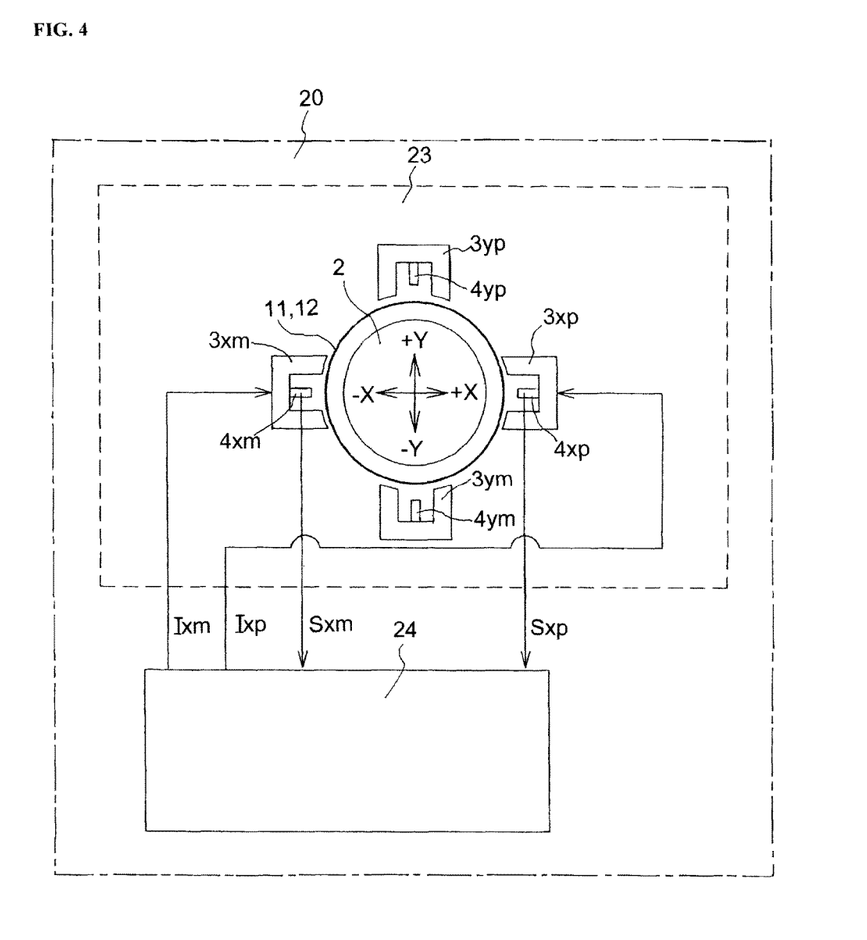
FIG. 4 is a conceptual view showing a configuration of a magnetic bearing device including the magnetic bearing applied to the embodiment of the present disclosure and a controller.

FIG. 4 is a conceptual view showing a configuration of the magnetic bearing device including a magnetic bearing and a controller which is applied to the embodiment of the present disclosure. As shown in FIG. 4, the magnetic bearing device 20 is configured to include a magnetic bearing 23 and a controller 24. In the radial direction of the magnetic bearing 23, a pair of the radial electromagnets (+x electromagnet 3xp and −x electromagnet 3xm) are arranged in an x-direction (+x to −x direction) of the rotor shaft 2 to face each other. In the vicinity of the radial electromagnets (+x electromagnet 3xp and −x electromagnet 3xm), the radial sensors (+x sensor 4xp and −x sensor 4xm) which detect a displacement of the rotor shaft in the x-direction are arranged. Respective displacement signals Sxp and Sxm from the radial sensors (+x sensor 4xp and −x sensor 4xm) are fed back to the controller 24. On the other hand, control signals (currents) Ixp and Ixm from the controller 24 are supplied to a pair of the radial electromagnets (+x electromagnet 3xp and −x electromagnet 3xm) along the X-axis. Accordingly, by the currents Ixp and Ixm controlled by the fed-back displacement signals Sxp and Sxm, an attracting force of the +x electromagnet 3xp and the −x electromagnet 3xm is controlled. As a result, the rotor shaft 2 operates so as to return to a reference position (center position).

Also, in the radial direction of the magnetic bearing 23, a pair of the radial electromagnets (+y electromagnet 3yp and −y electromagnets 3ym) are arranged in the y-direction of the rotor shaft 2 to face each other. In the vicinity of the radial electromagnets (+y electromagnet 3yp and −y electromagnet 3ym), the radial sensors (+y sensor 4yp and −y sensor 4ym) which detect a displacement of the rotor shaft in the y-direction are arranged. Note that, since FIG. 4 is a view illustrating currents in the X-axis direction, a signal system for the radial electromagnets (+y electromagnet 3yp and −y electromagnet 3ym) along the y-direction and the radial sensors (+y sensor 4yp and −y sensor 4ym) along the y-direction is omitted therein. In FIG. 4, the radial sensors 4xp, 4xm, 4yp, and 4ym along the X-axis and the Y-axis seem to be fixed to the respective radial electromagnets 3xp, 3xm, 3yp, and 3ym. However, since the mounting height positions of the radial sensors 4xp, 4xm, 4yp, and 4ym are different from those of the radial electromagnets 3xp, 3xm, 3yp, and 3ym, the radial sensors 4xp, 4xm, 4yp, and 4ym and the radial electromagnets 3xp, 3xm, 3yp, and 3ym are actually not fixed to each other. When abnormally displaced, the rotor shaft 2 is configured to be supported by the protective dry bearings 11 and 12 in the vicinity of the both ends thereof (see FIG. 2).

In such a configuration, the radial sensors (+x sensor 4xp, −x sensor 4xm) as displacement sensors detect a position of the rotor shaft 2 and feeds back the displacement signals Sxp and Sxm to the controller 24. Then, the controller 24 performs signal processing on the basis of a difference between the detected position and the reference position stored in advance to properly determine currents allowed to flow in the radial electromagnets (+x electromagnet 3xp, −x electromagnet 3xm). Then, the intended currents (Ixp, Ixm) are supplied from a current control amplifier (not shown) in the controller 24 to the radial electromagnets (+x electromagnet 3xp, −x electromagnet 3xm). Consequently, the radial electromagnets (+x electromagnet 3xp, −x electromagnet 3xm) operate so as to return the rotor shaft 2 to the reference position (center position on the X-axis in the radial direction) by the intended attracting force. With regard to the Y-axis in the radial direction also, the radial electromagnets (+y electromagnet 3yp, −y electromagnet 3ym) similarly operate so as to return the rotor shaft 2 to the reference position (center position on the Y-axis in the radial direction).

Figure 5:
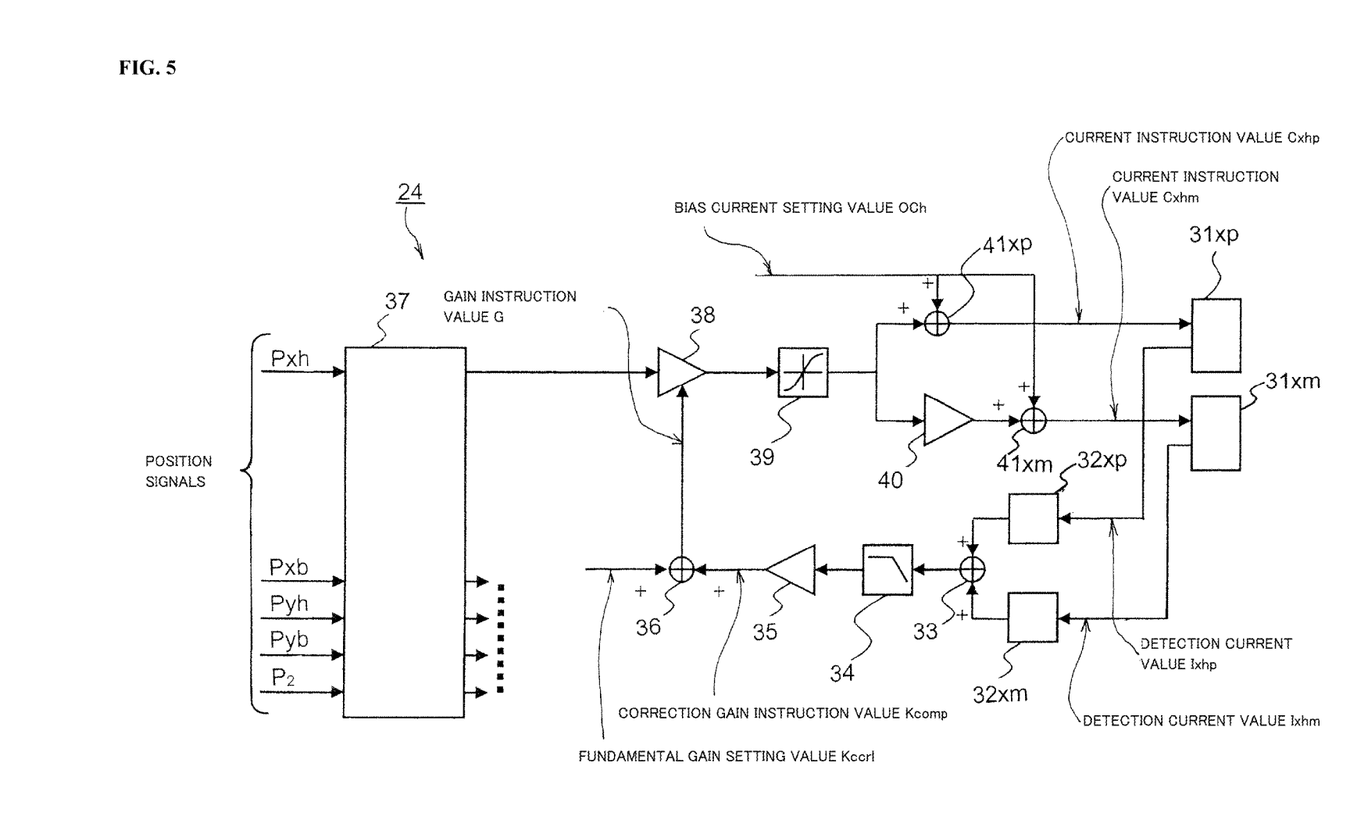
FIG. 5 is a block diagram showing a control system of the controller of the magnetic bearing applied to the embodiment of the present disclosure.

FIG. 5 is a block diagram showing a control system of the controller of the magnetic bearing applied to the embodiment of the present disclosure. The drawing shows only the control system of the controller which controls the currents in a pair of the electromagnets (radial electromagnets) arranged to intervene in the Xh-axis in the radial direction of the rotor shaft of the magnetic bearing.

First, a description will be given of a configuration of the controller of the magnetic bearing shown in FIG. 5 and respective functions of components thereof. The controller 24 is configured to include current control amplifiers 31xp and 31xm which individually control respective currents in a pair of the electromagnets facing each other in the radial direction, square multipliers 32xp and 32xm which square respective current detection values from the current control amplifiers 31xp and 31xm, an adder 33 which adds up the squared current detection values, a low pass filter 34 which averages the current detection values squared/added up, a correction coefficient multiplier 35 which multiplies the current detection values squared/added up and output from the low pass filter 34 by a correction coefficient, an adder 36 which adds up the correction gain instruction value output from the correction coefficient multiplier 35 and a fundament gain setting value to obtain a gain instruction value G, a compensator 37 which processes a force instruction middle signal having position information of the rotor shaft along the four axes in the radial direction and the one axis in a thrust direction thereof and outputs the processed force instruction middle signal, a gain amplifier 38 which performs, on the basis of gain instruction value G, an amplification process on the force instruction middle signal output from the compensator 37 along the Xh-axis, a force-current linearizer 39 which linearizes a characteristic of the non-linear force-current instruction middle signal output from the gain amplifier 38, an inverter 40 which branches the linearized current instruction middle signal and inverts one of the resulting signals, an adder 41xp which adds up the non-inverted current instruction middle signal and a bias current setting value to obtain a current instruction value and outputs the current instruction value to the current control amplifier 31xp, and an adder 41xm which adds up the current instruction middle signal inverted by the inverter 40 and the bias current setting value to obtain the current instruction value and outputs the current instruction value to the current control amplifier 31xm.

Next, a detailed description will be given of the function of each of the components shown in FIG. 5. The current control amplifier 31xp has a function for allowing a proper current (excitation current) to flow in the +x electromagnet 3xp (see FIG. 4) as one of the electromagnets facing each other in the radial direction of the rotor shaft. The current control amplifier 31xm has a function for allowing a proper current (excitation current) to flow in the −x electromagnet 3xm (see FIG. 4) as the other of the electromagnets facing each other in the radial direction of the rotor shaft.

The square multipliers 32xp and 32xm have a function of acquiring current detection values (Ixhp, Ixhm) of the electromagnet pair (+x electromagnet 3xp and −x electromagnet 3xm) which attract the rotor shaft (not shown) of the magnetic bearing in opposite directions along the X-axis from the current control amplifiers 31xp and 31xm and squaring the respective current detection values (Ixhp, Ixhm). The adder 33 has a function of adding up the respective current detection values that have been squared by the square multipliers 32xp and 32xm to obtain (Ixhp$^2$+Ixhm$^2$). The low pass filter 34 has a function of averaging the value (Ixhp$^2$+Ixhm$^2$) obtained by squaring/adding up the currents and output from the adder 33.

The correction coefficient multiplier 35 has a function of multiplying the value (Ixhp$^2$+Ixhm$^2$) obtained by squaring/adding up the currents and output from the adder 33 via the low pass filter 34 by a correction coefficient Kcd for correcting a displacement of the rotor shaft to calculate an average value of a correction gain instruction value Kcomp=Kcd(Ixhp$^2$+Ixhm$^2$) for correcting the unstable spring coefficient of the magnetic bearing. The adder 36 has a function of adding up the correction gain instruction value Kcomp output from the correction coefficient multiplier 35 and the fundamental gain setting value Kctrl that has been set in advance irrespective of the mounting posture of the magnetic bearing to obtain a gain instruction value G (Kctrl+Kcomp).

The compensator 37 has a function of processing position signals along the four axes Pxh, Pyh, Pxb, and Pyb in the radial direction of the rotor shaft and the one axis Pz in the thrust direction thereof and outputting the force instruction middle signal having position information of the rotor shaft. Note that the position signal Pxh is from a pair of the radial sensors 4xp and 4xm which detect relative displacements of a pair of the electromagnets 3xp and 3xm in the X-axis (Xh-axis) direction in an upper part of the 5-axis-control magnetic bearing shown in FIG. 1. The position signal Pyh is from a pair of the radial sensors 4yp and 4ym which detect relative displacements of a pair of the electromagnets 3yp and 3ym in the Y-axis (Yh-axis) direction in the upper part of the 5-axis-control magnetic bearing shown in FIG. 1. Likewise, the position signal Pxb is from a pair of the radial sensors 6xp and 6xm which detect relative displacements of a pair of the electromagnets 5xp and 5xm in the X-axis (Xb-axis) direction in a lower part of the 5-axis-control magnetic bearing shown in FIG. 1. The position signal Pyb is from a pair of the radial sensors 6yp and 6ym which detect relative displacements of a pair of the electromagnets 5yp and 5ym in the Y-axis (Yb-axis) direction in the lower part thereof. On the other hand, the position signal Pz is from the axial sensor 8z which detects relative displacements (displacements in the thrust direction) of the axial electromagnets 7zm and 7zp arranged in a vertical pair in the Z-axis direction. If processing systems for such position signals along all the five axes are shown, illustration of the signal processing systems is complicated. To avoid the complicated illustration, in FIG. 5, a signal processing system only for the position signal Pxh is shown as a representative. The gain amplifier 38 has a function of receiving the force instruction middle signal that has been generated by the compensator 37 and output along the Xh-axis and performing an amplification process on the force instruction middle signal along the Xh-axis on the basis of the gain instruction value G (Kctrl+Kcomp) that has been output from the adder 36 and set.

The force-current linearizer 39 has a function of linearizing the current instruction middle signal (force-current characteristic signal) having non-linearity and output from the gain amplifier 38 on the basis of the bias current setting value. Note that the force-current linearizer 39 detects the bias current setting value and switches a circuit thereof only when there is no current in each of a pair of the electromagnets 5xp and 5xm to enable the linearizing function. The inverter 40 has a function of inverting one of the signals branched from the linear current instruction middle signal output from the force-current linearizer 39. The adder 41xp has a function of adding up the non-inverted current instruction middle signal and a bias current setting value OCh to obtain a current instruction value Cxhp and outputting the current instruction value Cxhp to the current control amplifier 31xp. The adder 41xm has a function of adding up the current instruction middle signal inverted by the inverter 40 and the bias current setting value OCh to obtain a current instruction value Cxhm and outputting the current instruction value Cxhm to the current control amplifier 31xm.

Next, a description will be given of an operation of the controller of the magnetic bearing shown in FIG. 5 with reference to FIG. 4. The description will be given herein using, as an example, the case of controlling bias currents in a pair of the facing electromagnets (see +x electromagnet 3xp and −x electromagnet 3xm in FIG. 4) along the Xh axis in the radial direction of the rotor shaft.

First, the current detection values (Ixhp, Ixhm) of a pair of the electromagnets (+x electromagnet 3xp and −x electromagnet 3xm) which attract the rotor shaft in opposite directions are respectively acquired from the current control amplifiers 31xp and 31xm and calculate a sum (Ixhp^2+Ixhm^2) of the squares of the current detection values using the square multipliers 32xp and 32xm and the adder 33. Then, after the (Ixhp^2+Ixhm^2) is averaged through the low pass filter 34, the correction coefficient arithmetic operator 35 multiplies the averaged (Ixhp^2+Ixhm^2) by the correction coefficient Kcd to calculate an average value of the correction gain instruction value Kcomp=Kcd(Ixhp^2+Ixhm^2) for correcting the instability (unstable spring constant) of the magnetic bearing. Note that what is input to the square multipliers 32xp and 32xm may also be the bias current instruction values (Cxhp and Cxhm), not the current detection values (Ixhp and Ixhm). Even though the low pass filter 34 is not used, there is no problem with a basic operation. However, to prevent a noise failure resulting from the rotation of the rotor shaft of the magnetic bearing or the like, the low pass filter 34 is preferably used.

Next, the adder 36 adds up the correction gain instruction value Kcomp obtained by the correction coefficient arithmetic operator 35 and the fundamental gain Kctrl which is uniquely determined irrespective of the mounting posture of the magnetic bearing to obtain the gain instruction value G (Kctrl and Kcomp) and sets the gain instruction value G (Kctrl+Kcomp) to the gain amplifier 38.

On the other hand, the compensator 37 processes the position signals of the rotor shaft along the four axes Pxh, Pyh, Pxb, and Pyb in the radial direction to generate respective force instruction middle signals along the individual axes. A description will be given herein of the case where the compensator 37 generates the force instruction middle signal along the Xh-axis. The force instruction middle signal along the Xh-axis generated by the compensator 37 is input to the gain amplifier 38 to which the gain instruction value G (Kctrl+Kcomp) has been set. Consequently, the gain amplifier 38 performs an amplification process on the force instruction middle signal along the Xh-axis on the basis of the gain instruction value G (Kctrl+Kcomp) obtained by correcting the unstable spring constant for the fundamental gain Kctrl based on the mounting posture of the magnetic bearing and outputs the force instruction middle signal along the Xh-axis.

Since the attracting force of an electromagnet is proportional to a square of a current, a force-current characteristic has non-linearity. Accordingly, the output signal (force instruction middle signal) from the gain amplifier 38 is then input to the force-current linearizer 39 and linearized using the bias current setting value OCh. Therefore, the force-current linearizer 39 detects the bias current setting value OCh and switches the circuit only when there is a current to enable the linearization function. Note that the force-current linearizer 39 need not be used. However, in that case, control performance of current correction deteriorates.

Then, the force instruction middle signal output from the force-current linearizer 39 is branched such that a polarity of one of the resulting signals remains unchanged, while a polarity of the other signal is inverted. This is for allowing currents having opposite polarities to flow in a pair of the facing radial electromagnets (+x electromagnet 3xp and −x electromagnet 3xm) arranged in intervening relation on both sides along the Xh-axis in the radial direction of the rotor shaft.

That is, one of the signals branched from the force instruction middle signal output from the force-current linearizer 39 is directly subjected to addition with the bias current setting value OCh by the adder 41xp to be generated as the current instruction value Cxhp. The other signal branched from the force instruction middle signal is inverted by the inverter 40 and then subjected to addition with the bias current setting value OCh by the adder 41xm to be generated as the current instruction value Cxhm. In other words, the respective current instruction values (Cxhp, Cxhm) for the electromagnet pair (+x electromagnet 3xp and −x electromagnet 3xm) which attract each other in the opposite radial directions are generated and input to the current control amplifiers 31xp and 31xm.

As a result, from the current control amplifier 31xp, a current for which the unstable spring constant based on the mounting posture of the magnetic bearing has been corrected flows in the radial electromagnet (+x electromagnet 3xp) disposed on one side along the Xh-axis in the radial direction. On the other hand, from the current control amplifier 31xm, a current for which the unstable spring constant based on the mounting posture of the magnetic bearing has been corrected flows in the radial electromagnet (−x electromagnet 3xm) disposed on the other side along the Xh-axis in the radial direction.

That is, when the rotor shaft of the magnetic bearing is disposed perpendicular to the gravity, no gravity is applied along the Xh-axis so that, in each of the electromagnets, only a small current in accordance with the bias current setting value OCh flows. Accordingly, the gain instruction value G (Kctrl+Kcomp) set to the gain amplifier 38 is small and the currents in the magnetic bearing are controlled with a low gain.

However, when the posture of the rotor shaft is changed to be horizontal, a large current flows in each of the electromagnets along the Xh-axis so as to float the rotor shaft against gravity. When the large current flows, the unstable spring constant Kd of the magnetic bearing increases to reduce the rigidity of the magnetic bearing unless appropriate measures are taken. Accordingly, in the configuration of the embodiment of the present disclosure, the large gain instruction value G (Kctrl+Kcomp) set to the gain amplifier 38 is increased and the magnetic bearing is controlled in accordance with the current instruction value amplified with a high gain. This can ensure a proper rigidity for the magnetic bearing without reducing the rigidity of the magnetic bearing.

Note that the current correcting function in the controller shown in FIG. 5 can arbitrarily be disabled during the adjustment of the magnetic bearing device or the like. In that case, as has been described using FIG. 4, the control function includes only the feedback of the displacement signals Sxp and Sxm by the radial sensors (+x sensor 4xp, −x sensor 4xm).

Next, a description will be given of a function of compensating for the unstable spring constant of the magnetic bearing which is performed by the controller using numerical expressions. Note that reference marks used in the following numerical expressions are defined as follows.

$F_0$: Present-time total attracting force (force) generated by pair of facing electromagnets in units [N]

$\delta_0$: Present-time air gap between electromagnets in units [m]

$Iplus_0$: Present-time current in plus-side electromagnet (+x electromagnet 3xp) in units [A]

$Iminus_0$: Present-time current in minus-side electromagnet (−x electromagnet 3xm) in units [A]

$\Delta F$: Attracting force (force) which changes between present time and moment later in units [N]

$\Delta \delta$: Air gap which changes between present time and moment later in units [m]

F: Moment-later total attracting force (force) generated by pair of facing electromagnets in units [N]

A: Proportional constant between force and squared current ($A=F/I^2$) in units [N/A^2]

Gctrl: Spring constant of magnetic bearing (uncorrected fundamental value of control circuit) in units [N/m]

Kctrl: Fundamental gain of gain amplifier to be added to correction gain in (non-dimensional) units Krem: Remaining coefficient resulting from subtraction of fundamental gain Kctrl from spring constant Gctrl of magnetic bearing in units [N/m], which accordingly satisfies Gctrl=Kctrl×Krem When the individual reference marks are defined as shown above, the moment-later total attracting force (force) generated by a pair of the facing electromagnets (+x electromagnet 3xp and −x electromagnet 3xm) is given by the following numerical expression.

$$F = F_0 + Gctrl \times \Delta\delta - (2A \times Iplus_0^2/\delta_0 + 2A \times Iminus_0^2/\delta_0) \times \Delta\delta \quad (1)$$

Here, the correction parameter Kcd and the correction gain Kcomp are introduced. Note that $Kcd = 2 A/\delta_0$ is satisfied and, since a variation in air gap $\delta_0$ is small, the correction parameter Kcd is used herein as a fixed constant.

Accordingly, the correction gain Kcomp is given by the following numerical expression (2).

$$Kcomp = Kcd \times (Iplus_0^2 + Iminus_0^2) = (2A \times Iplus_0^2/\delta_0 + 2A \times Iminus_0^2/\delta_0) \quad (2)$$

When the correction gain Kcomp is added to the fundamental gain setting value of the circuit herein, the moment-later total attracting force F generated from a pair of the facing electromagnets is given by the following numerical expression (3).

$$F = F_0 + Gctrl \times \Delta\delta - (2A \times Iplus_0^2/\delta_0 + 2A \times Iminus_0^2/\delta_0) \times \Delta\delta + Kcomp \times \Delta\delta \quad (3)$$

Note that, in the numerical expression (3) representing the moment-later force "F" of the electromagnets, the first term is the present-time force of the electromagnets, the second term is a spring force with which the magnetic bearing returns the rotor shaft to the center, the third term is the force of the unstable spring constant of the magnetic bearing, and the fourth term is a force which corrects a displacement of the rotor shaft.

The numerical expression (3) shown above is represented as the numerical expression (4).

$$F = F_0 + Gctrl \times \Delta\delta \quad (4)$$

Accordingly, as can be seen from the numerical expression (4) shown above, by adding the correction gain instruction value to the fundamental gain, a state is achieved in which the moment-later total attracting force (F) of a pair of the facing electromagnets is a sum of only the spring force (Gctrl×Δδ) which returns the rotor shaft to the center of the magnetic bearing and the present-time total attracting force (F0) of a pair of the electromagnets. Thus, the attracting force resulting from the unstable spring constant of the magnetic bearing is cancelled out. That is, a pair of the facing electromagnets exert only the force which returns the rotor shaft to the center of the magnetic bearing.

Note that the ($Iplus_0^2 + Iminus_0^2$) shown in each of the foregoing numerical expressions includes ripple or noise resulting from the rotation frequency of the magnetic bearing. Accordingly, the calculation of the correction gain $Kcomp = Kcd \times (Iplus_0^2 + Iminus_0^2)$ shown in the numerical expression (2) needs to be performed after the signal is caused to pass through a low pass filter of about 1 Hz.

A description will be given herein of a correspondence relationship between each of the units described in claims in the scope of claims and each of the components shown in FIG. 5. A current acquisition unit corresponds to the two square multipliers 32xp and 32xm and the adder 33. A correction coefficient arithmetic unit corresponds to the correction coefficient arithmetic operator 35. A first addition unit corresponds to the adder 36. A current control unit corresponds to the gain amplifier 38, the inverter 40, the adders 41xp and 41xm, and the current control amplifiers 31xp and 31xm. A squaring unit corresponds to the square multipliers 32xp and 32xm. A second addition unit corresponds to the adder 33. A linearization unit corresponds to the force-current linearizer 39. Note that the control function 24 may be implemented as an electronic component (discrete) using an operation amplifier or the like or may also be implemented as software using a microcomputer, a digital signal processor (DSP), or the like.

While the specific embodiment of the present disclosure has been described heretofore, the present disclosure is not limited to the embodiment. Various modifications can be made to the present disclosure without departing from the spirit of the present disclosure, and it should be clearly understood that the present disclosure is intended to encompass such modifications.

The magnetic bearing device of the present disclosure is a non-lubricated magnetic bearing device featuring non-contact support and capable of low-vibration and ultra-high-speed rotation. Therefore, the magnetic bearing device of the present disclosure can effectively be used not only for a vacuum pump, but also a centrifugal compressor, a turbine generator, a turbo expander, a grinding spindle, a blood flow pump, a semiconductor manufacturing device, a measurement/analysis device, or the like.

EXPLANATION OF REFERENCE NUMERALS

1: DC MOTOR; 2: ROTOR SHAFT; 3, 3xp, 3xm, 3yp, 3ym, 5, 5xp, 5xm, 5yp, and 5ym: RADIAL ELECTROMAGNETS; 4, 4xp, 4xm, 4yp, 4ym, 6, 6xp, 6xm, 6yp, and 6ym: RADIAL SENSORS; 7, 7zp, and 7zm: AXIAL ELECTROMAGNETS; 8 and 8z: AXIAL SENSORS; 11 and 12: PROTECTIVE DRY BEARINGS; 13: STATOR VANE; 14: ROTOR VANE; 15: INLET PORT FLANGE; 16: OUTLET PORT FLANGE; 20: MAGNETIC BEARING DEVICE; 21, 21a, 21b, 21c, and 21d: VACUUM PUMPS; 22: SEMICONDUCTOR MANUFACTURING DEVICE; 23: MAGNETIC BEARING; 24: CONTROLLER; 31xp and 31xm: CURRENT CONTROL AMPLIFIERS (CURRENT CONTROL UNIT); 32xp and 32xm: SQUARE MULTIPLIERS (CURRENT ACQUISITION UNIT, SQUARING UNIT); 33: ADDER (CURRENT ACQUISITION UNIT, SECOND ADDITION UNIT); 34: LOW PASS FILTER; 35: CORRECTION COEFFICIENT ARITHMETIC OPERATOR (CORRECTION COEFFICIENT ARITHMETIC UNIT); 36: ADDER (FIRST ADDITION UNIT); 37: COMPENSATOR; 38: GAIN AMPLIFIER (CURRENT CONTROL UNIT); 39: FORCE-CURRENT LINEARIZER (LINEARIZATION UNIT); 40: INVERTER; 41xp and 41xm: ADDERS (CURRENT CONTROL UNIT).

What is claimed is:

1. A magnetic bearing device, comprising:
   a magnetic bearing that supports a rotor shaft in a state of non-contact, using an electromagnetic force of an electromagnet; and
   a controller that controls the magnetic bearing, wherein the controller includes:
   a current acquisition means for acquiring steady-state current values of respective currents flowing in a pair of the electromagnets that attract the rotor shaft of the magnetic bearing in opposite directions;
   a correction coefficient arithmetic means for determining, from the steady-state current values, a correction gain instruction value for compensating for an unstable spring constant due to an attracting force of a pair of the electromagnets, which results from a mounting posture of the magnetic bearing;
   a first addition means for adding up the correction gain instruction value and a fundamental gain, which is uniquely determined irrespective of the mounting posture of the magnetic bearing, to obtain a gain instruction value; and
   a current control means for controlling respective currents flowing in a pair of the electromagnets, using a current instruction value generated on the basis of the gain instruction value,
   wherein the gain instruction value of the electromagnet in direction of gravity changes depending on the mounting posture based on a value of the respective currents of the pair of the electromagnets.

2. The magnetic bearing device according to claim 1, wherein the current acquisition means acquires the steady-state current values on the basis of current detection values of respective currents flowing in a pair of the electromagnets or on the basis of the current instruction value.

3. The magnetic bearing device according to claim 1, wherein the current control means controls a force instruction middle signal having position information of the rotor shaft in accordance with the gain instruction value, and adds up the force instruction middle signal, which is controlled in accordance with the gain instruction value, and a bias current setting value to generate the current instruction value.

4. The magnetic bearing device according to claim 1, wherein the current instruction value cancels out the unstable spring constant for a pair of the electromagnets and exerts only a force which returns the rotor shaft to a center of the magnetic bearing.

5. The magnetic bearing device according to claim 1, wherein the current acquisition means includes:
   a pair of squaring means for individually squaring the steady-state current values of the respective currents flowing in a pair of the electromagnets; and
   a second addition means for adding up the steady-state current values individually squared by the pair of squaring means.

6. The magnetic bearing device according to claim 5, further comprising:
   a low pass filter that performs an averaging process on the steady-state current values squared and added up by the pair of squaring means and the second addition means and transmits a value resulting from the averaging process to the correction constant arithmetic means.

7. The magnetic bearing device according to claim 6, wherein the low-pass filter has a resonance frequency of about 1 Hz.

8. The magnetic bearing device according to claim 3, further comprising:
   a linearization means for linearizing, using the bias current setting value, a non-linear characteristic showing a relationship between the current instruction value generated by the current control means and the attracting force of the electromagnets.

9. The magnetic bearing device according to claim 8, wherein the linearization means functions only when no current is flowing in each of a pair of the electromagnets.

10. A vacuum pump, comprising:
a magnetic bearing device comprising:
a magnetic bearing that supports a rotor shaft in a state of non-contact, using an electromagnetic force of an electromagnet; and
a controller that controls the magnetic bearing, wherein the controller comprises:
a current acquisition means for acquiring steady-state current values of respective currents flowing in a pair of the electromagnets that attract the rotor shaft of the magnetic bearing in opposite directions;
a correction coefficient arithmetic means for determining, from the steady-state current values, a correction gain instruction value for compensating for an unstable spring constant due to an attracting force of a pair of the electromagnets, which results from a mounting posture of the magnetic bearing;
a first addition means for adding up the correction gain instruction value and a fundamental gain, which is uniquely determined irrespective of the mounting posture of the magnetic bearing, to obtain a gain instruction value; and
a current control means for controlling respective currents flowing in a pair of the electromagnets, using a current instruction value generated on the basis of the gain instruction value,
wherein the gain instruction value of the electromagnet in direction of gravity changes depending on the mounting posture based on a value of the respective currents of the pair of the electromagnets.

11. The magnetic bearing device according to claim 2, wherein the current control means controls a force instruction middle signal having position information of the rotor shaft in accordance with the gain instruction value, and adds up the force instruction middle signal, which is controlled in accordance with the gain instruction value, and a bias current setting value to generate the current instruction value.

12. The magnetic bearing device according to claim 2, wherein the current instruction value cancels out the unstable spring constant for a pair of the electromagnets and exerts only a force which returns the rotor shaft to a center of the magnetic bearing.

13. The magnetic bearing device according to claim 3, wherein the current instruction value cancels out the unstable spring constant for a pair of the electromagnets and exerts only a force which returns the rotor shaft to a center of the magnetic bearing.

14. The magnetic bearing device according to claim 2, wherein the current acquisition means includes:
a pair of squaring means for individually squaring the steady-state current values of the respective currents flowing in a pair of the electromagnets; and
a second addition means for adding up the steady-state current values individually squared by the pair of squaring means.

15. The magnetic bearing device according to claim 3, wherein the current acquisition means includes:
a pair of squaring means for individually squaring the steady-state current values of the respective currents flowing in a pair of the electromagnets; and
a second addition means for adding up the steady-state current values individually squared by the pair of squaring means.

16. The magnetic bearing device according to claim 4, wherein the current acquisition means includes:
a pair of squaring means for individually squaring the steady-state current values of the respective currents flowing in a pair of the electromagnets; and
a second addition means for adding up the steady-state current values individually squared by the pair of squaring means.

17. The magnetic bearing device according to claim 4, further comprising:
a linearization means for linearizing, using the bias current setting value, a non-linear characteristic showing a relationship between the current instruction value generated by the current control means and the attracting force of the electromagnets.

18. A magnetic bearing device, comprising:
a magnetic bearing that supports a rotor shaft in a state of non-contact, using an electromagnetic force of an electromagnet; and
a controller that controls the magnetic bearing, wherein the controller includes:
a current acquisition means for acquiring current values of respective currents flowing in a pair of the electromagnets that attract the rotor shaft of the magnetic bearing in opposite directions;
a correction coefficient arithmetic means for determining, from the current values, a correction gain instruction value of a pair of the electromagnets, which results from a mounting posture of the magnetic bearing;
a first addition means for adding up the correction gain instruction value and a fundamental gain, which is uniquely determined irrespective of the mounting posture of the magnetic bearing, to obtain a gain instruction value; and
a current control means for controlling the current values, using a current instruction value generated on the basis of the gain instruction value,
wherein the gain instruction value of the electromagnet in direction of gravity changes depending on the mounting posture based on a value of the respective currents of the pair of the electromagnets.

* * * * *